United States Patent [19]

Pullen

[11] 3,740,728

[45] June 19, 1973

[54] INPUT/OUTPUT CONTROLLER

[75] Inventor: Charles A. Pullen, Culver City, Calif.

[73] Assignee: Hughes Aircraft Company, Culver City, Calif.

[22] Filed: Jan. 19, 1972

[21] Appl. No.: 218,980

Related U.S. Application Data

[63] Continuation-in-part of Ser. No. 43,495, June 4, 1970.

[52] U.S. Cl. .......... 340/172.5
[51] Int. Cl. .......... G06f 3/00
[58] Field of Search .......... 340/172.5

[56] References Cited

UNITED STATES PATENTS

| | | | |
|---|---|---|---|
| 3,400,371 | 9/1968 | Amdahl et al. | 340/172.5 |
| 3,581,286 | 5/1971 | Beausoleil | 340/172.5 |
| 3,336,582 | 8/1967 | Beausoleil et al. | 340/172.5 |
| 3,303,474 | 2/1967 | Moore et al. | 340/172.5 |
| 3,680,054 | 7/1972 | Bunker et al. | 340/172.5 |
| 3,413,613 | 11/1968 | Bahrs et al. | 340/172.5 |

*Primary Examiner*—Gareth D. Shaw
*Attorney*—W. H. Macallister, Jr. and Donald C. Keaveney

[57] ABSTRACT

An input/output controller which is substantially independent of the central processor of a computer system for controlling data transfer between the central processor memory and a plurality of input/output channels. The central processor, under program control, sets initial conditions and starts the controller for each input/output channel on which data transfer is to take place. The controller has control of the data transfer with the central processor not involved further until a memory access is required. The initial conditions are retained in the controller until changed by the central processor to enable a block of data to be repetitively transferred.

5 Claims, 11 Drawing Figures

INVENTOR
CHARLES A. PULLEN,
BY
Bernard P. Drachlis
ATTORNEY

PATENTED JUN 19 1973

3,740,728

SHEET 7 OF 8

INPUT/OUTPUT CONTROLLER

RELATED APPLICATIONS

This application is a continuation-in-part of my prior application Ser. No. 43,495 filed on June 4, 1970 which was co-pending with this application on its filing date and which is assigned to the same assignee as is this application.

BACKGROUND OF THE INVENTION

This invention relates to digital computer equipment, particularly of the on-line, real time type, and more particularly to a device for the control of the transfer of such data between a central processor memory and a plurality of input/output (I/O) channels.

One method of controlling data transfer between the main computer memory and the input/output (I/O) channel is to have the computer program assume detailed control of the data transfer. This requires the central processor to maintain detailed information concerning data transfer for each I/O channel. Detailed information required would include the length of a block of data to be transferred, the current word of data in memory to be transferred, the priority of service of the various I/O channels, etc. This method of controlling input and output from the memory can be time-consuming for the central processor. This time consumption can be a serious problem in real time computing systems, especially since most real time computing systems have a high input/output data flow.

On the other hand, prior art devices such as that shown in U.S. Pat. No. 3,413,613 to Bahrs et al. which are designed to provide multiple configurations of off-line data processing systems are needlessly complex and essentially unsuitable for real time applications wherein it may be desired not only to connect a preselected one of a plurality of input channels directly to a processor, but also to select by address a preselected one of a plurality of multiplexed inputs provided over each input channel. Such is the case, for example, where each input channel is connected to an anlog to digital converter which sequentially samples the analog outputs of a plurality of transducers and converts them to digital signals. Systems of the type shown by Bahrs provide no capability for generating addresses to be supplied to each input channel, but rather simply use the input/output controller to buffer or store data received from the inputs rather than transmitting it directly to the processor as is desirable in real time use. The unnecessary complexity of Bahrs, which is due to the fact that his purpose is primarily to provide multiple configuration off-line system of maximum flexibility, thus, still does not provide the capability to achieve the specialized on-line real time purpose for which the present invention is intended.

SUMMARY OF THE INVENTION

The present invention relates to an input/output controller which is capable of operating substantially independently of the central processor and frees the central processor from the time-consuming operation of controlling data flow between the central processor and a plurality of I/O channels. The controller is operable to perform many control functions to thereby minimize the amount of control logic required in the central processor and in the external devices connected to the I/O channels. The central processor, under program control, sets initial conditions in the controller for data transfer on each of the I/O channels. The program then starts the controller for each of the I/O channels on which data transfer is to take place. The controller then takes over complete control of the data transfer. The central processor is not involved further in the data transfer until a memory access is required. The initial conditions are retained in the controller until changed by the central processor under program control. This, for example, enables a block of data in sequential word addresses to be repetitively transferred. This capability is of particular advantage where digital signals are being output to digital-to-analog converters which do not have digital holding registers but have analog memory circuits. Thus, since the outputs from the analog memory circuits tend to drift with time, the digital signals can be repetitively output to keep the analog outputs within tolerance.

DESCRIPTION OF THE DRAWINGS

The novel features and advantages of the invention will become more apparent from the following detailed description when taken in conjunction with the accompanying drawings in which:

FIG. 3 is a timing diagram of the signals for operation of the input/output controller;

DESCRIPTION OF THE PREFERRED EMBODIMENT

Figure 1A:
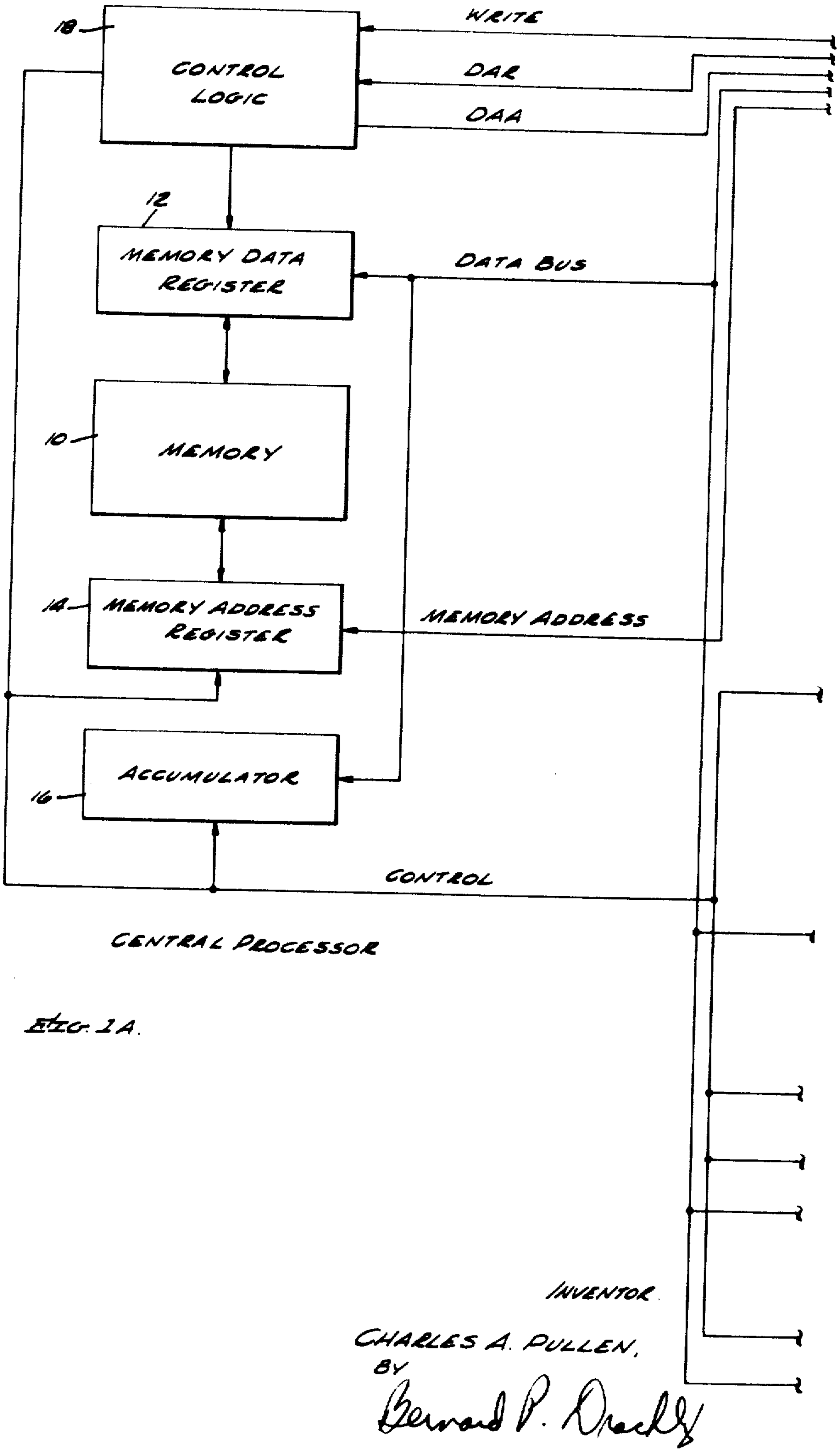
FIG. 1*a* is a schematic diagram illustrating a portion of a typical computer central processor which can utilize the invention.
Figure 1B:
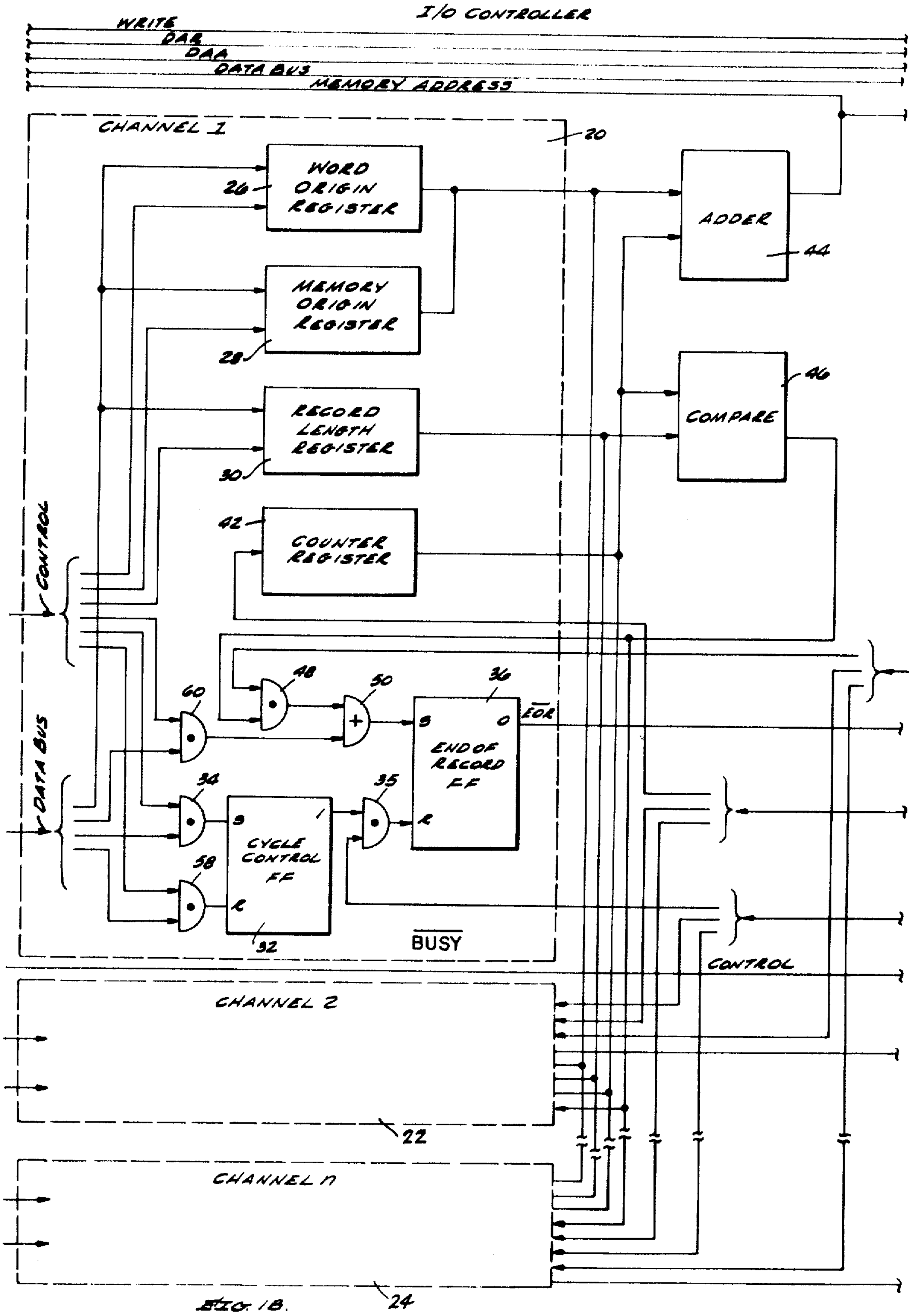
FIG. 1*b* is a schematic diagram continuing the showing of FIG. 1a and illustrating a portion of the preferred embodiment of the input/output controller.
Figure 1C:
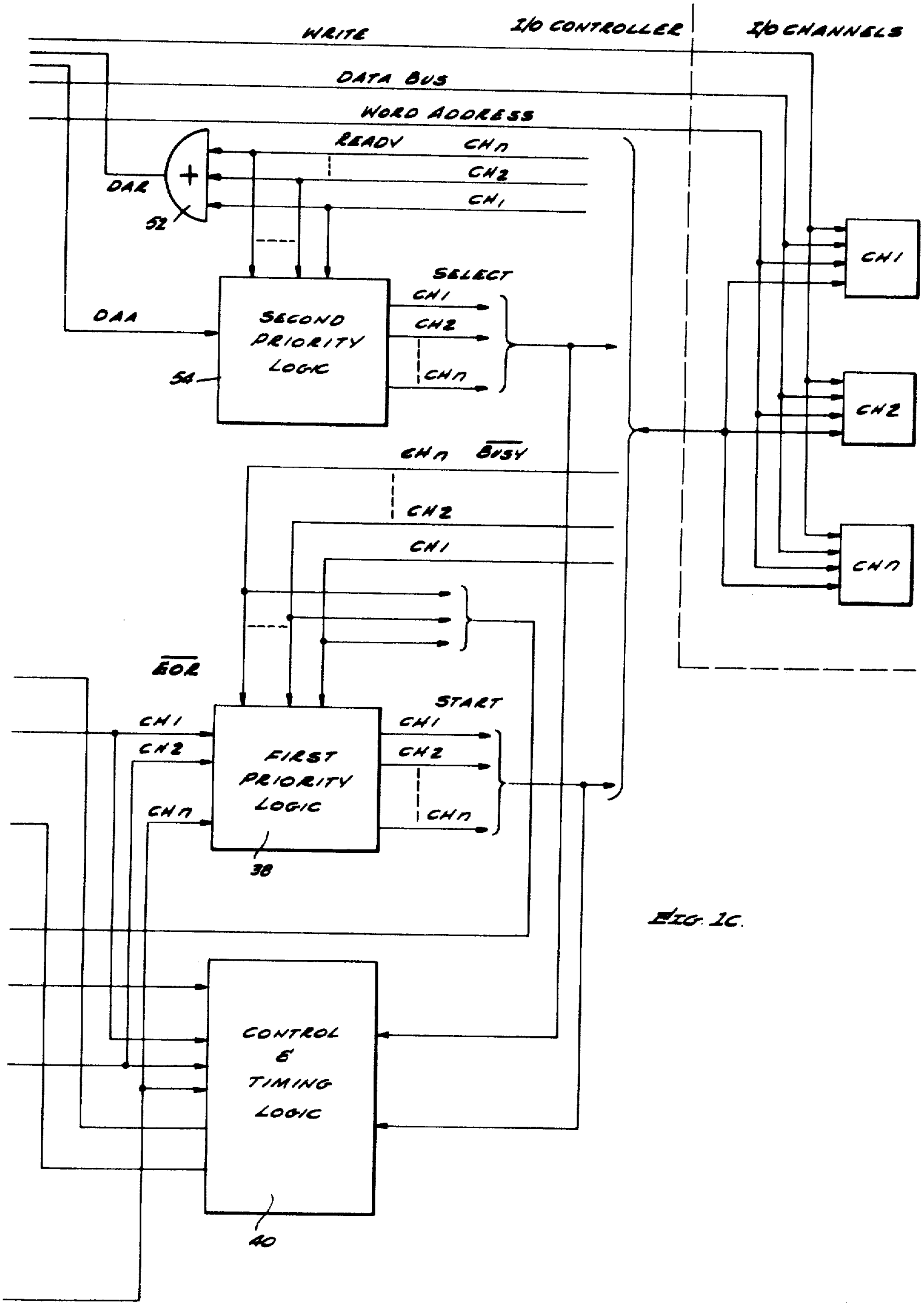
FIG. 1*c* is a schematic diagram continuing the showing of FIGS. 1*a* and 1*b* and illustrating the remainder of the preferred embodiment of the input/output controller.
Figure 1D:
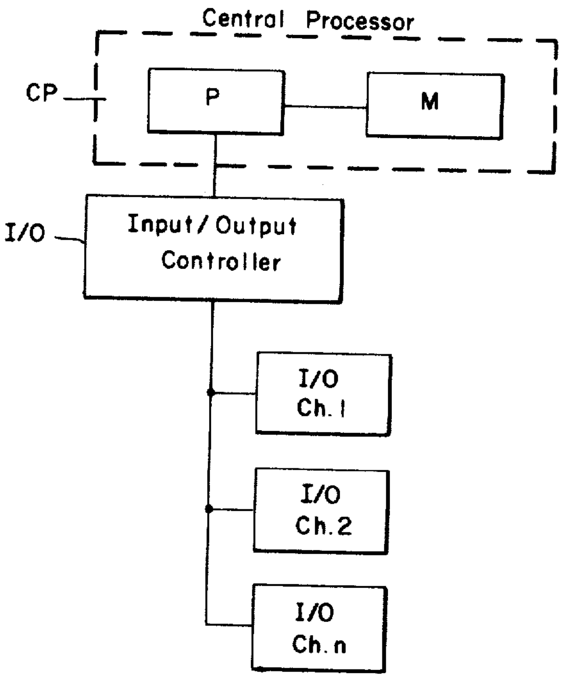
FIG. 1*d* is a block diagram at a more general level illustrating the entire system shown in FIGS. 1*a*, 1*b*, and 1*c* taken together.

Referring to the drawings in more detail, FIG. 1d is a generalized block diagram showing of the entire system the details of which may be seen in the combined views of FIGS. 1*a*, 1*b*, and 1*c*. In FIG. 1*d* it will be seen that the central processor indicated by the dashed block CP broadly includes a data processor P and memory units M. More specific detail of the central processor is shown in FIG. 1*a*. From FIG. 1*d* it will be noted that data flow to and from the central processor and a plurality of *n* input/output channels is under the control of and passes directly through the input/output controller I/O which is shown in more specific detail in FIGS. 1*b* and 1*c*.

FIG. 1*a* shows a portion of the central processor, the details of which will be described subsequently. The central processor can send and accept data by means of the DATA BUS. The central processor also generates control signals and sends them on the CONTROL lines. The central processor accepts Direct Access Request (DAR) signals when a memory access is required by the input/output system. The central processor generates a Direct Access Acknowledge (DAA) signal when the central processor is ready to perform a memory access for the input/output system. The central processor also accepts a WRITE signal when the memory access operation is being used to input data to the central processor memory. The central processor also accepts a MEMORY ADDRESS from the input/output system which indicates the memory location which is to be accessed for the input/output system.

FIG. 1b shows a portion of the input/output controller, the details of which will be described subsequently. The controller accepts data from the central processor on the DATA BUS under control of control signals from the central processor. The controller generates the MEMORY ADDRESS and sends it to the central processor on the MEMORY ADDRESS line.

FIG. 1c shows the remaining portion of the I/O controller and the I/O channels. This portion of the I/O controller generates START and SELECT signals and sends them to the I/O channels at the appropriate times. The controller also generates a WORD ADDRESS and sends it to each I/O channel to indicate the address of the I/O channel to be used for the data transfer. The I/O channels generate $\overline{\text{BUSY}}$ and READY signals and send them to the controller, generate WRITE signals and send them to the central processor, and accept and send data on the DATA BUS. The I/O controller generates the Direct Access Request (DAR) signal and sends it to the central processor and accepts the Direct Access Acknowledge (DAA) signal from the central processor.

It is assumed throughout this description of the preferred embodiment, unless otherwise noted, that all circuits operate in a parallel manner rather than a serial manner. Of course, it should be understood that the I/O controller could be constructed using serial operation but this would not be advantageous in most cases due to the additional operating time of the logic.

It should be understood that the blocks of data to be transferred are in sequential word addresses in the central processor and the input/output channels. This is the normal method of storing blocks of data.

The detailed operation of the controller will now be described with reference to FIGS. 1*a*, 1*b*, 1*c*, 2 and 3. The central processor will have a main memory 10 shown in FIG. 1a which can be of any conventional type and which is included in the memory block M shown in FIG. 1*d*. In the following description, it will be assumed that the main memory 10 is a conventional random access destructive readout magnetic core memory system. The memory system will generally have a memory data register 12 which acts as a buffer between the memory 10 and the remainder of the computer system. The usual memory system will also have a memory address register 14 which stores the address of the memory location currently being accessed. The memory access sequence is usually a two-step operation. The first step is for the information stored in the appropriate memory address as determined by the memory address register, to be read into the memory data register 12 from the memory 10. The next step is for the contents of the memory data register 12 to be read back into the memory location in the memory 10 determined by the memory address register 14. This will normally occur in two successive clock times. The central processor has an accumulator 16 connected to various portions of the central processor, as well as to the DATA BUS. The central processor also has control logic 18 coupled to control the sequence and timing of the various operations performed by the central processor. Only that portion of a typical central processor involved in data transfer with input/output channels has been described in detail herein, the entire processor being simply indicated by block P in FIG. 1*d*.

The portion of the I/O controller shown in FIG. 1*b* includes registers and control flip flops associated with each I/O channel. The portion of the I/O controller associated with the first I/O channel CH-1 is illustrated in detail and enclosed within the dashed line circuit block 20. There is a similar set of registers and control flip flops for each of the other n input/output channels where *n* is an integer. These are shown symbolically by the dashed circuit block 22 for the second I/O channel and circuit block 24 for the *n*th generalized I/O channel where *n* is an integer.

Figure 2:
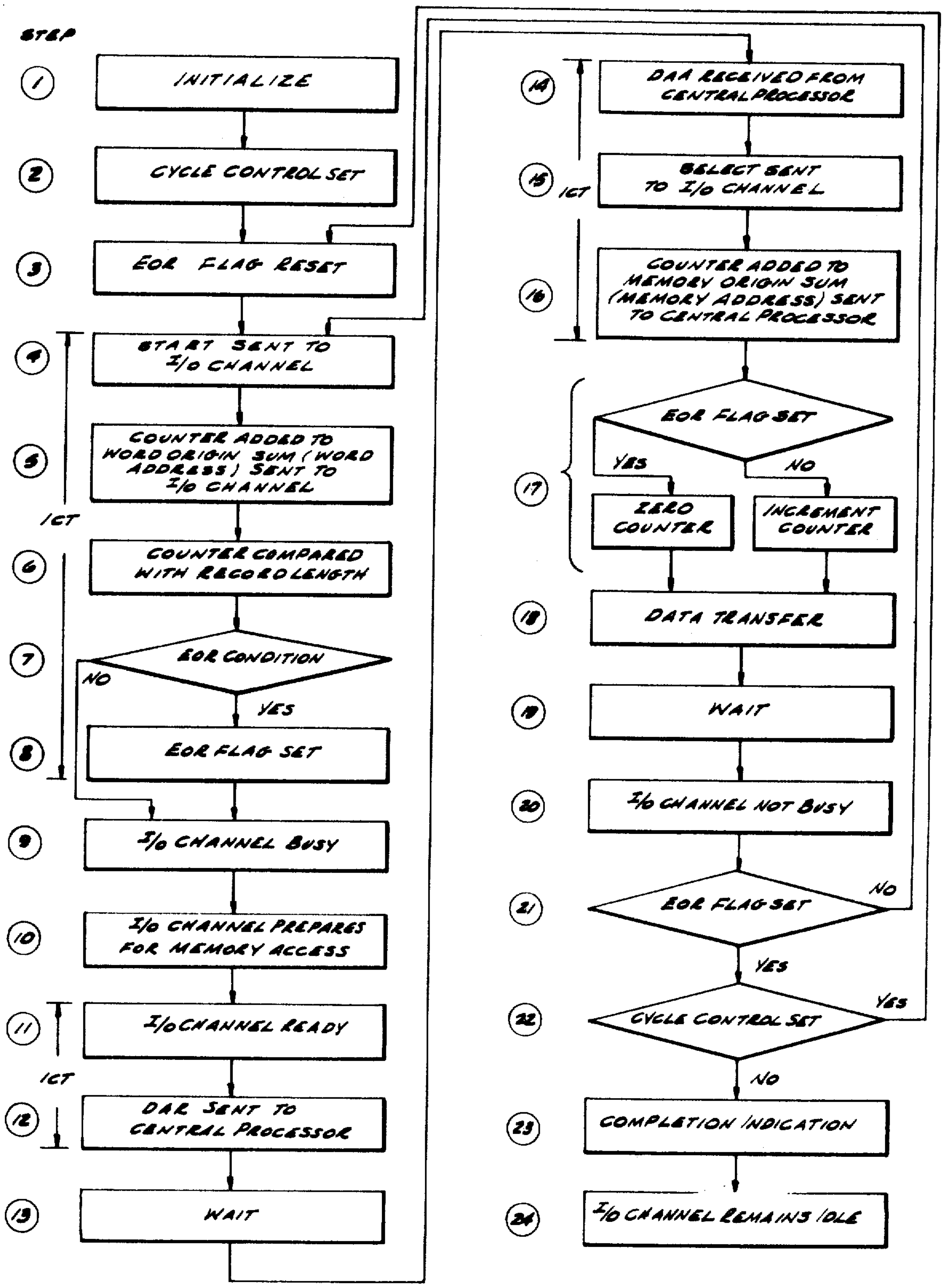
FIG. 2 is a flow chart depicting the sequence of operations performed by the central processor and input-/output controller of FIGS. 1*a* through 1*c*.
Figure 9:
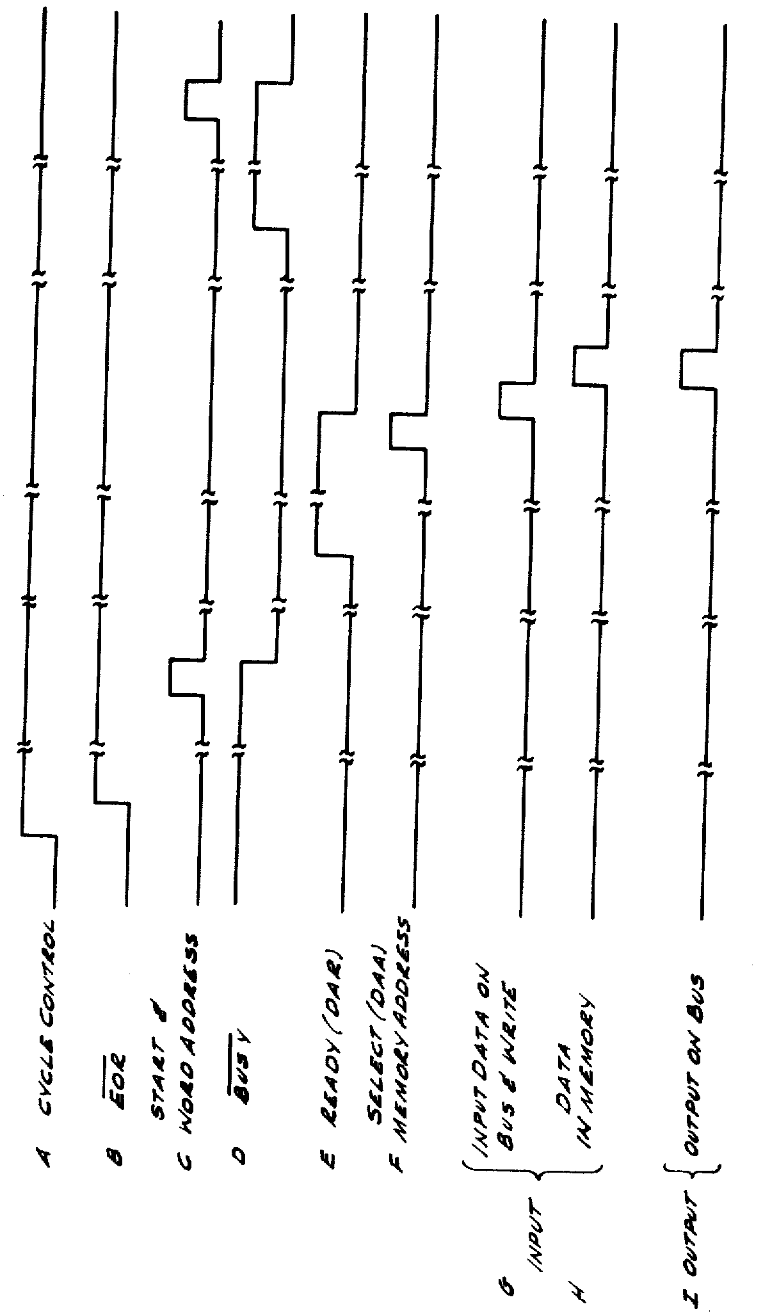

When data is to be transferred between the central processor and an I/O channel, the I/O controller is first initialized as indicated by step 1 of the flow chart of FIG. 2 by having the central processor under program control send initial information to the I/O controller for each I/O channel which is to have a data transfer. This initial information is the word origin which is the word address in the I/O channel for the first word in the block of data to be transferred, the memory origin which is the memory address in the central processor memory 10 of the first word in the block of data to be transferred, and the record length which is the number of words in the block of data to be transferred. This initial information may be sent from the memory data register 12 or from the accumulator 16 by means of the DATA BUS to the appropriate registers in the I/O controller. The control logic 18 of the central processor determines the proper register for each word of initial information by sending appropriate control signals on the CONTROL lines under program control. The word origin information is stored in a word origin register 26. The memory origin information is stored in a memory origin register 28. The record length information is stored in a record length register 30. The registers may be of any convenient type, such as flip flop registers or implemented as a word or part of a word in a memory such as a semiconductor memory, for example. The number of bits in each register will depend on the details of the particular central processor and I/O channels used with the I/O controller. Similar initial information may be stored in the I/O controller at this time for each I/O channel which is to have a data transfer or the initial information may be stored at a later time which is prior to the data transfer for the particular I/O channel. The initial information is retained in the controller until changed by the central processor.

When a data transfer for a particular I/O channel is to begin, a Cycle Control Set step is performed as indicated by step 2 of FIG. 2 by having the central processor set a cycle control flip flop 32 by sending appropriate signals on the DATA BUS and on the CONTROL line under control of the control logic 18. These signals will be applied to the inputs of an AND gate 34 causing the output thereof to go true. This output signal is applied to the set terminal S to set the cycle control flip flop 32. The output waveform of the cycle control flip flop 32 is shown by waveform A of FIG. 3. The cycle control flip flop 32 may be of any convenient type, such as an R-S flip flop, for example. Once the cycle control flip flop for a particular I/O channel is set, the data transfer operation for that I/O channel will proceed according to the information stored in the controller without further control from the central processor.

The end-of-record (EOR) flag will now be reset as indicated by step 3 of FIG. 2. The set output of the cycle control flip flop 32 is applied to one input terminal of an AND gate 35. The other input to AND gate 35 is the $\overline{\text{BUSY}}$ signal for the particular channel. The output of AND gate 35 is applied to the reset input R of an end-of-record flip flop 36. When both inputs to AND gate 35 are true, the output goes true and will reset the end-of-record flip flop 36. The end-of-record flip flop 36 may be of any convenient type, such as an R-S flip flop, for example. This will put the $\overline{\text{EOR}}$ signal to the true state. The output waveform for $\overline{\text{EOR}}$ is shown by waveform B of FIG. 3. This $\overline{\text{EOR}}$ signal is applied to a first priority logic circuit 38 and to control and timing logic 40. The details of the first priority logic circuit 38 will be described later with reference to FIG. 4 and the details of control of timing logic 40 will be similarly described with reference to FIGS. 5, 6, 7 and 8.

The cycle control flip flop for more than one I/O channel may be set at the same time. If this is the case, EOR signals may be true for more than one I/O channel. The first priority logic circuit 38 is used to determine the order in which the I/O channels shall be serviced. The first priority logic circuit 38 accepts BUSY signals from the I/O channels which indicate whether the channel is busy. If the BUSY signal is true, the channel is available for a data transfer. The I/O channel with the highest priority which is not busy and which has its EOR signal true, is sent a START signal from the first priority logic circuit 38. This is indicated by step 4 of FIG. 2. The START signals are also sent to the control and timing logic 40 to indicate which I/O channel is being sent a START signal. The START signal is shown by waveform C of the timing diagram of FIG. 3.

At the same time that the START signal is being sent to the I/O channel, the controller generates and sends the WORD ADDRESS to the I/O channel as indicated by step 5 of FIG. 2. The control and timing logic 40 sends control signals to the word origin register 26 and to a counter register 42 which may be of any convenient type such as a flip flop register or implemented as a word or part of a word in a memory such as a semiconductor memory, for example. The counter register 42 is initially set to zero. The counter register keeps track of the number of words which have been transferred. The contents of the word origin register 26 and the counter register 42 are added together in an adder 44 which may be of any conventional type. The sum output of the adder 44 is sent to the I/O channels on the WORD ADDRESS line. Only the I/O channel which is being sent a START signal will accept the WORD ADDRESS on the WORD ADDRESS line to indicate the address in the I/O channel to be used for the data transfer.

At the same time that the WORD ADDRESS is being generated by the adder 44, the control and timing logic 40 is also sending a signal to the record length register 30. This enables the contents of the record length register 30 and the contents of the counter register 42 to be applied to a comparison circuit 46. This is indicated by step 6 of FIG. 2. This comparison circuit 46 may be of any convenient type. For example, it may be an adder which will take the difference between the contents of the record length register 30 and the counter register 42. The output of the comparison circuit 46 is applied to one input of an AND gate 48. The other input to the AND gate 48 is a control signal from the control and timing logic 40 indicating which I/O channel the comparison signal applied to. The output of AND gate 48 is applied to one input of an OR gate 50, the output of which is applied to the set input S of the end-of-record flip flop 36. If the comparison circuit determines the contents of the record length register 30 and the contents of the counter register 42 are identical, a signal is sent through the AND gate 48 and the OR gate 50 to set the end-of-record flip flop 36 as indicated by steps 7 and 8 of FIG. 2. This setting of the end-of-record flip flop 36 so that $\overline{\text{EOR}}$ is false is an indication that the last word in the block of data to be transferred is now being transferred. Steps 4, 5, 6, 7 and 8 in FIG. 2 occur essentially simultaneously during one clock time as shown by the 1 CT indication in FIG. 2.

When an I/O channel receives a START signal, it immediately resets its $\overline{\text{BUSY}}$ signal to false as indicated by step 9 of FIG. 2 to indicate that the I/O channel is preparing for a data transfer, as indicated by step 10 of FIG. 2. The $\overline{\text{BUSY}}$ signal is shown by waveform D of the timing diagram of FIG. 3. The $\overline{\text{BUSY}}$ signal is applied to the first priority logic circuit 38 to indicate that the particular I/O channel can not be sent additional START signals and WORD ADDRESSes prior to completion of the current data transfer.

At this time, the controller may send START signals and WORD ADDRESSes to other I/O channels that are available for data transfer. This would mean that steps 4, 5, 6, 7 and 8 in FIG. 2 would be repeated for other I/O channels that are available for a data transfer.

When an I/O channel is ready for a data transfer, it sends a READY signal to the I/O controller as indicated by step 11 of FIG. 2 and waveform E of FIG. 3. READY signals are applied to an OR gate 52. The READY signals are also applied to a second priority logic circuit 54, the details of which will be described later. When any READY signal is applied to the OR gate 52, the output of the OR gate 52 goes true and is sent directly to the central processor as a Direct Access Request (DAR) signal, as indicated by step 12 of FIG. 2. The DAR signal is applied to the control logic 18 of the central processor. The DAR signal indicates that the input/output system is ready for a data transfer. Steps 11 and 12 occur essentially simultaneously during one clock time as shown symbolically by the 1 CT indication in FIG. 2. There is then a waiting period for the central processor to prepare for a data transfer. This is shown as step 13 in FIG. 2. During this waiting period, READY signals may be received from additional I/O channels.

When the central processor is ready for a data transfer, it sends a Direct Access Acknowledge (DAA) signal to the I/O controller as indicated by step 14 in FIG. 2. This DAA signal is applied to the second priority logic circuit 54 which determines the I/O channel with the highest priority having its READY signal true. This I/O channel is sent a SELECT signal as indicated by step 15 of FIG. 2 and waveform F of FIG. 3. At the same time, the second priority logic circuit 54 sends a signal to the control and timing logic 40 indicating which channel has been selected. The control and timing logic 40 sends signals on the control lines to the memory origin register 28 and the counter register 42 to enable the contents of each of these registers to be applied to the adder 44. The output of the adder 44 will be the MEMORY ADDRESS in the central processor memory 10 for the current data transfer. The MEMORY ADDRESS is applied to the memory address register 14 in the central processor. This is shown as step 16 in FIG. 2. Steps 14, 15 and 16 occur essentially simultaneously during one clock time as shown symbolically by the 1 CT indication in FIG. 2.

While the data transfer is taking place, the control and timing logic 40 checks the status of the end-of-record flip flop for the particular I/O channel. If the end-of-record flip flop has not been set, it is an indication that the complete block of data for the particular I/O channel has not been transferred. If this is the case, the control and timing logic 40 sends a signal to the counter register 42 to count up by one to indicate that another word of the block of data has been transferred. If, however, the end-of-record flip flop has been set, it is an indication that the last word in the block of data has now been transferred. In this case, the control and timing logic cirucit 40 sends a signal to the counter register 42 to zero the contents of the counter register in preparation for the transfer of the next block of data on the particular I/O channel. This operation is indicated by step 17 of FIG. 2.

The data transfer now takes place as indicated by step 18 in FIG. 2. During the first clock time of the memory access sequence, the contents of the memory location specified by the MEMORY ADDRESS register 14 is read into the memory data register 12. If the data transfer operation being performed is an output from the central processor to the I/O channel, the contents of the memory data register 12 remains the same. During the second clock time of the memory access sequence, the contents of the memory data register 12 are read back into the memory location in the memory 10 specified by the MEMORY ADDRESS register 14. Also during this second clock time of the memory access sequence, the data in the memory data register 12 will be available on the DATA BUS and is read by the selected I/O channel. This completes a data transfer operation for one word of data. The output data timing is shown by waveform I in FIG. 3.

If the data transfer operation is to be an input to the central processor from the I/O channel, the sequence of operations is slightly different. During the first clock time of the memory access sequence, the data from the memory location specified by the MEMORY ADDRESS register 14 will be destructively read out of the memory 10. Also, during this clock time the I/O channel will place the word of data to be input to the central processor on the DATA BUS. At the same time the I/O channel will send a WRITE signal directly to the control logic 18 of the central processor. This WRITE signal is an indication that the I/O channel is inputting data to the central processor. The control logic 18 then sends a signal to the memory data register 12 which allows the memory data register to accept the data on the DATA BUS rather than accepting the data from the specified memory location. The memory data register 12 is set to the data which is being input by the I/O channel on the DATA BUS. Now, during the second clock time of the memory access cycle, the contents of the memory data register 12 is read back into the memory location as specified by the MEMORY ADDRESS register 14. In this way the data from the I/O channel is placed in the proper memory location. The input data timing is shown by waveforms G and H in FIG. 3.

A convenient feature of this sequence of operations is that the contents of the memory data register 12 will be available during the second clock time of the memory access sequence just as if it were an output operation. In this way, during the second clock time of the memory access sequence, the I/O channel can verify that the data on the DATA BUS is the data that was being sent to the central processor during the first clock time of the memory access sequence. This, of course, is a function of the device connected to the particular I/O channel and it is not mandatory that the device actually be capable of verifying the data transferred.

The I/O channel now prepares for another data transfer. The time this will take is variable depending upon the particular external device which is connected to the I/O channel. This is shown as step 19 in FIG. 2. During this time, other I/O channels can be selected for data transfer. It should be noted that the controller is only committed to a particular I/O channel after a select signal has been sent to that I/O channel at step 15. The controller becomes uncommitted after the data transfer takes place at step 18. When the I/O channel is ready for another data transfer, the $\overline{BUSY}$ signal is set to true to indicate that the I/O channel is available. This is shown as step 20 in FIG. 2.

If the previous data transfer for the channel did not complete the transfer of the block of data for that channel, the $\overline{EOR}$ signal for the channel will be true and the controller returns to step 4 and repeats the data transfer process for the particular I/O channel. This is shown as step 21 in FIG. 2. If the block of data has been sent as indicated by the $\overline{EOR}$ signal being false and the cycle control flip flop remains set to indicate that the block of data is to be repetitively transferred, the controller returns to step 3 and repeats the process for the particular I/O channel. This is shown as step 22 in FIG. 2.

If the block of data is not required to be transferred repetitively, the cycle control flip flop will be reset by the central processor after the transfer of the block of data was first started. The cycle control flip flop 32 is reset by appropriate signals on the DATA BUS and the control line being applied to the inputs of an AND gate 58. The output of the AND gate 58 is applied to the reset input R of the cycle control flip flop 32. If it is desired to stop the transfer of a block of data before the whole block of data has been completely transferred, appropriate signals can be sent from the central processor on the DATA BUS and the control lines to inputs of an AND gate 60. The output of the AND gate 60 is applied to one input of the OR gate 50, the output of which is applied to the set input S of the end-of-record flip flop 36 to force an end-of-record condition.

If no further data transfers are to be made for the particular I/O channel, a completion indication may be sent to the central processor by the control and timing logic 40. This is shown as step 23 in FIG. 2. At this time, the particular I/O channel will remain idle until restarted by the central processor. This is shown as step 24 in FIG. 2.

Figure 4:
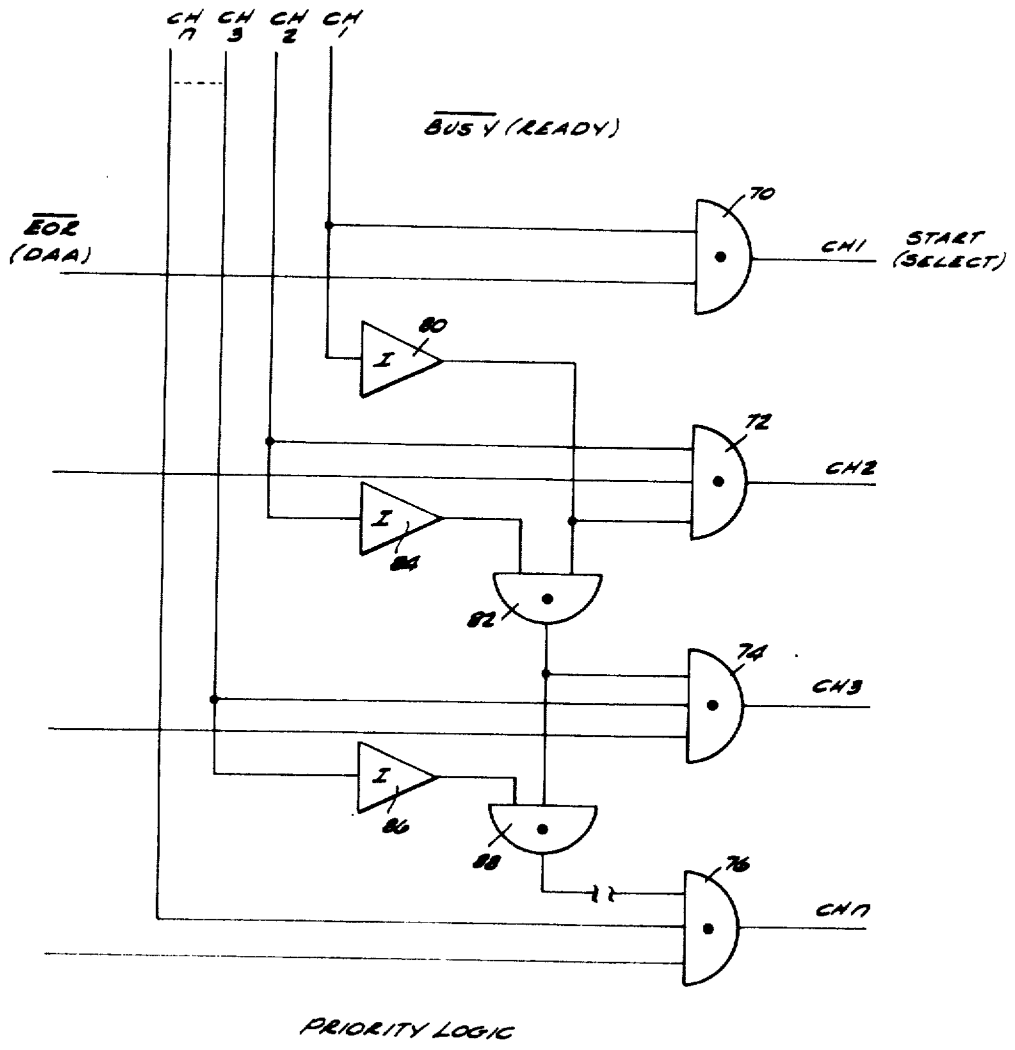
FIG. 4 is a schematic diagram of a priority circuit which may be used with the input/output controller.

FIG. 4 shows one type of priority circuit that may be used for the first priority logic circuit 38 and the second priority logic circuit 54. The circuit will be described with reference to the signal names for the first priority logic circuit 38 with the signal names for the second priority logic circuit being shown in parenthesis in FIG. 4. For convenience, the lowest numbered channel is considered to have the highest priority. The priority circuit includes a series of output AND gates 70, 72, 74 and 76. There will be one AND gate for each I/O channel. The output of the output AND gate will be the start signal for the particular channel. The input to the AND gate 70 for channel 1, which is the highest priority channel, will be the $\overline{\text{BUSY}}$ signal for channel 1 and the $\overline{\text{EOR}}$ signal for channel 1. When both of the signals are true, the output of the AND gate 70 will be true and the start signal will be sent to the I/O channel. The inputs to the AND gates 72, 74 and 76 also include a signal indicative of whether a channel with higher priority is presently not busy. This is accomplished by inverting the $\overline{\text{BUSY}}$ signal for each channel, ANDing them together, and applying them to the output AND gate for the next succeeding I/O channel. For example, the $\overline{\text{BUSY}}$ signal for channel 1 is applied to an inverter 80, the output of which is applied to the AND gate 72. If channel 1 is not busy, as indicated by the $\overline{\text{BUSY}}$ signal being true, the output of the inverter 80 will be false. This will prevent the output of the AND gate 72 from going true. The output of the inverter 80 is also applied to an AND gate 82, which also prevents output AND gates for lower priority channels from going true if the $\overline{\text{BUSY}}$ signal for channel 1 is true. If the $\overline{\text{BUSY}}$ signal for channel 1 is false, the output of the inverter 80 will be true, and this output will not disable any of the subsequent output AND gates.

In a similar manner, the $\overline{\text{BUSY}}$ signal for channel 2 is applied to an inverter 84. The output of the inverter 84 is applied to a second input of the AND gate 82. If the $\overline{\text{BUSY}}$ signal for channel 1 is false and the $\overline{\text{BUSY}}$ signal for channel 2 is true, the output AND gate 72 will be enabled. The output of the inverter 84 will be false, which will disable the AND gate 82 and prevent any of the output AND gates for lower priority channels from being enabled. In a similar manner, the $\overline{\text{BUSY}}$ signal for channel 3 is applied to an inverter 86, which has its output applied to an AND gate 88 which will enable or disable lower priority output AND gates depending on the condition of the higher priority channels FIGS. 5 through 7 (taken together) show one type of control and timing logic circuit that may be used for the block 40 shown in FIG. 1*c*. FIG. 8 is detail of blocks 101 and 102 of FIG. 5. For convenience, the functions of the control and timing logic block 40 which have been separately discussed above in connection with other circuits are grouped and listed below. These functions are as follows:

a. Accepts the EOR and $\overline{\text{EOR}}$ signals from each of the end-of-record flip flop 36. See waveform B of FIG. 3 and FIGS. 6 and 7.
b. Accepts the START signals from the first priority logic circuit 38. See waveform C of FIG. 3 and FIG. 5.
c. Sends control signals to the word origin register 26 and to the counter register 42 to gate the contents of these registers to the adder 44 when the word address is to be generated. See output of blocks 101 and 103 in FIG. 5.
d. Sends control signals to the record length register 30 and to the counter register 42 to gate the contents of these registers to the comparison circuit 46. See step 6 of FIG. 2 and output of 101 and 103 in FIG. 5.
e. Sends a control signal to the AND gate 48, indicating which I/O channel the comparison signal applies to, in order to gate the end-of-record comparison to the end-of-record flip flop 36. See lead 110 FIG. 5.
f. Accepts the SELECT signals from the second priority logic circuit 54 to indicate which channel has been selected. See FIGS. 5, 6 and 7.
g. Sends control signals to the memory origin register 28 and the counter register 42 over the control lines to gate the contents of these registers to the adder 44 so that the output of adder 44 will be the MEMORY ADDRESS in the central processor memory 10 for the current data transfer. See output of blocks 102 and 103 in FIG. 5.
h. Checks the status of the end-of-record flip flop while the data transfer is taking place by the mechanization shown for function (a).
i. Sends a signal to the counter register 42 to either count up by one (refer to AND gate 104 in FIG. 7) or to zero (refer to AND gate 105 in FIG. 6) the contents of the counter register in response to the status of the end of record flip flop which in turn indicates whether or not a complete block of data has been transferred.
j. Sends a completion indication to the central processor. See step 23 in FIG. 2. See gate 105, FIG. 6.

These functions can be carried out as shown in FIGS. 5 through 8 with standard AND gates and OR gates interconnected in the manner shown therein which is well understood in the art of logic design.

Figure 5:
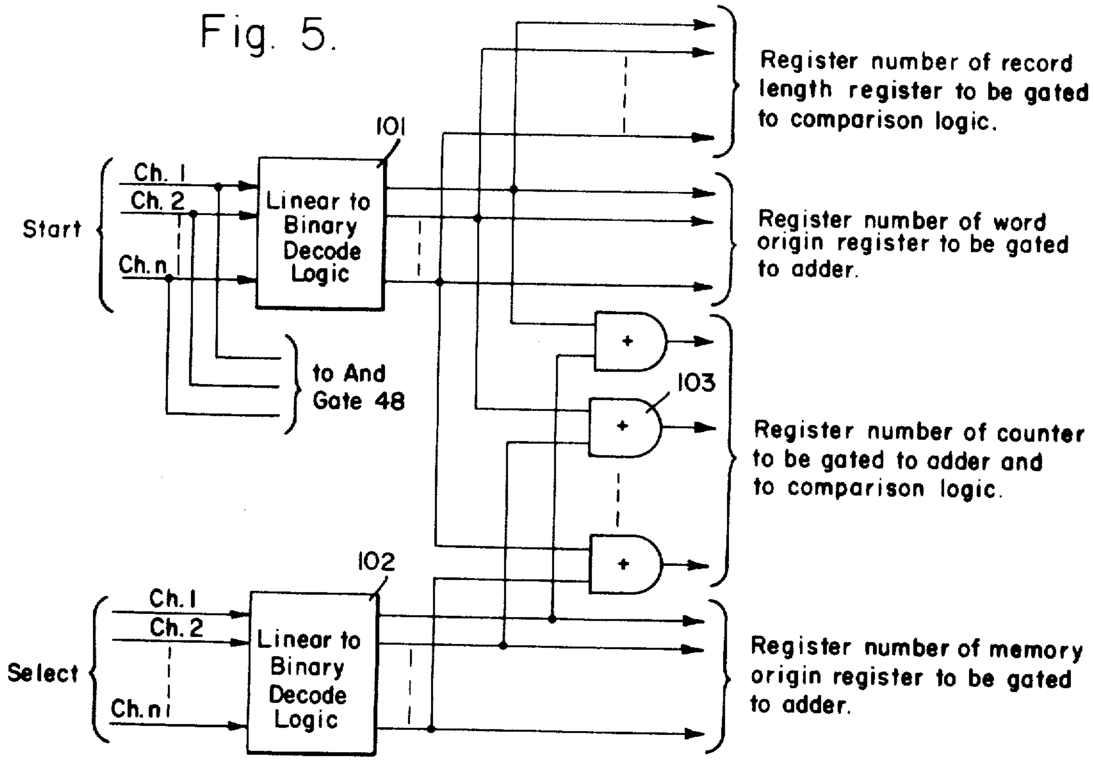
FIGS. 5, 6 and 7 comprises a schematic diagram of the control and timing logic circuit shown by block 40 of FIG. 1c.

With respect to function (b) it should be noted in FIG. 5 that the linear-to-binary decode logic 101 accepts the START signals from the priority logic 38 over the plurality of lines CH-1 through CH-n. The details of block 101 are shown in FIG. 8, it being understood that a duplicate of the circuit shown in FIG. 8 is also used for the block 102 of FIG. 5 and that the signal names indicated in parenthesis in FIG. 8 are applicable to the circuit when used for the block 102. Thus, as indicated in function (f) above, the block 102 mechanized as represented in FIG. 8 accepts the instructions of SELECT signals from the second priority logic circuit 54.

Figure 7:
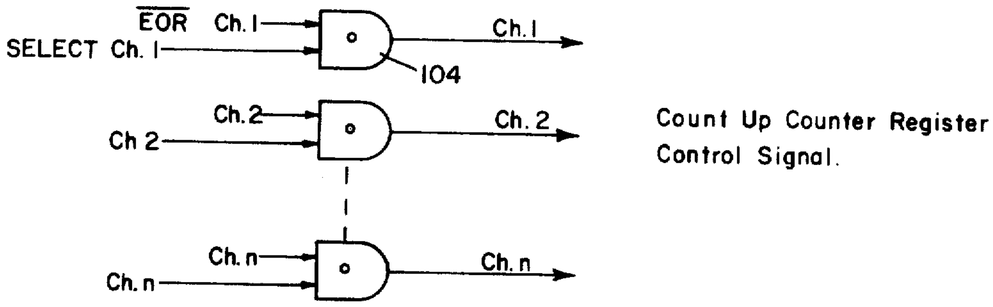
Figure 8:
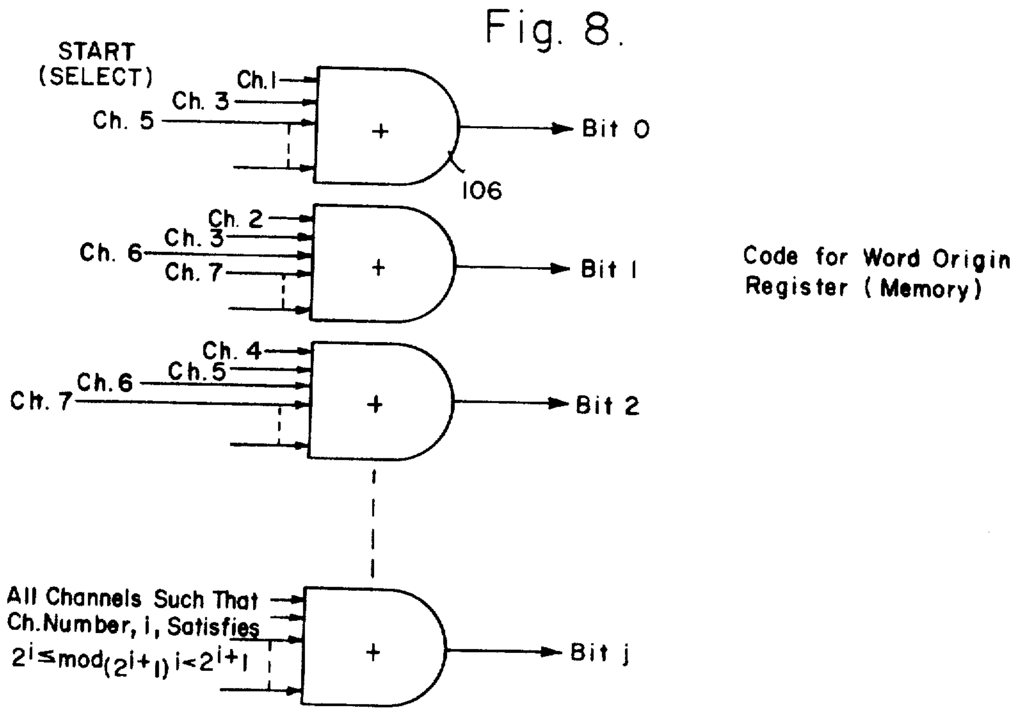
FIG. 8 is a more detailed diagram of the linear-to-binary decode logic shown on blocks 101 and 102 in FIG. 5.

The mechanization of function (a) is shown in FIG. 7 wherein the $\overline{\text{EOR}}$ signals from the end of record flip flop 36 are accepted by the appropriate one of the plurality 104 of AND gates shown in FIG. 7.

Figure 6:
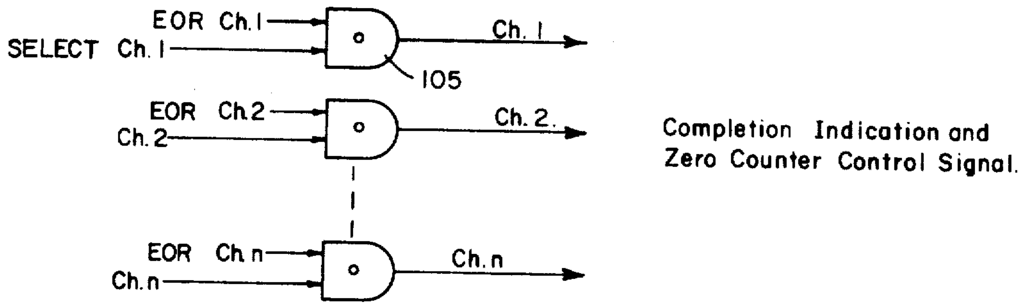

Functions (c), (d), and (g) are mechanized by the circuit of FIG. 5 whereas functions (i) and (j) are mechanized by the circuits of FIGS. 6 and 7. These and the other remaining functions will be more clearly understood by considering the timing diagram of FIG. 3 in connection with the circuits shown.

At the time shown in FIG. 3 when a START signal is issued to a channel *i*, the channel number is used to address one of the n counter registers 42. The addressing and selection of one of the n registers depends on the particular mechanization used for the registers, but, for example, binary address is shown and assumed, such as would be used to select one of n locations in a random access scratch pad memory. To generate a binary address of the desired register, linear-to-binary decode logic 101 is used to obtain the register number of the word origin register to be gated to the adder 44. The register number of the Counter Register 42 to be gated to adder 44 is the same as for Word Origin and is obtained from OR gates 103. See function (g).

At the same time the Counter Register 42 is gated into adder 44 to generate a word address, this same counter register 42 is gated into compare logic 46. Simultaneously, the record length register 30 for the channel being started is gated into compare logic 46. If the contents of counter register 42 equal record length register 30, compare logic output to AND gate 48 becomes true. The end of record FF 36 for the channel being started at that time is thus set, because the other input to AND gate 48 is START for that channel.

At the same time when the SELECT signal is issued, linear-to-binary decode logic 102 converts the selected channel number to an address of the Memory Origin Register 28 corresponding to that channel. This Memory Origin Register 28 is gated to adder 44. At the same time, the counter register 42 having the same number as the Memory Origin Register is addressed through gates 103 and selected into adder 44. Thus, the memory address is generated by adder 44 at the time shown at FIG. 5.

At the end of SELECT, the counter for the selected channel is either incremented or reset to zero, depending upon the end of record (EOR) FF 36 status (function *i*). As noted in function (h), this status is checked by AND gates 104 and 105 in FIGS. 6 and 7. If the end of record flip flop 36 is off (EOR equals one), then a count up control signal is generated for the selected channel by AND gate 104. If end of record flip flop 36 is on ($\overline{EOR}$ equals one) then a control signal causing the selected channel's counter to be reset to zero is generated by AND gate 105; this same signal signifies completion of that channel's assignment to the central processor (function j).

If the cycle control flip flop 32 is set on, it will cause resetting of end of record flip flop 36 through AND gate 35 as soon as the associated channels become available, that is ($\overline{BUSY}$). See $\overline{BUSY}$ input to gate 35 in FIG. 1b.

Linear-to-binary decode is performed by OR gates 106 arranged in the manner shown in FIG. 8. Each OR gate generates a "1" or "0" binary bit depending upon which START 101 (or SELECT 103) is true. The number of bits required is such that each channel can be uniquely represented. That is to say, $n<2^{Jmax}$. Each OR gate has $2^{(Jmax-1)}$ inputs, obtained from all channels such that $2^{J} \leq \mathrm{mod}_{(2^{J+1})} i < 2^{J+1}$.

It should be understood that the details of the various operations may be modified depending upon the characteristics of the particular type of circuits being used or the operation of the particular central processor. For example, if the memory access sequence of the central processor is different from that described above, appropriate changes in the logic of the controller could be made. As a further example, testing for an end-of-record condition as indicated by steps 6, 7 and 8 of FIG. 2 may occur at a later time in the sequence of operations if that would be convenient.

What is claimed is:

1. In a digital system, an input/output controller for controlling the real time transfer of individual words of blocks of data between a processor and a plurality of input/output channels, each of said input/output channels including at least one peripheral device selectively connected to said processor by said input/output controller, each block of data being associated with an individual input/output channel, the input/output controller comprising:

a. a plurality of storage means in said controller, each associated with one of the plurality of input/output channels, for storing digital signals from the processor to be used in controlling the transfer of data between the processor and the plurality of input/output channels; each of said plurality of storage means comprising a first register for storing the beginning address in the input/output channel for the transfer of the block of data, a second register for storing the beginning address in the processor for the transfer of the block of data, and a third register for storing the number of words in the block of data to be transferred;

b. first control means for controlling when data is to be transferred between the processor and each of the plurality of input/output channels, said first control means being operably controlled from the processor;

c. second control means operably connected to said first control means and to the plurality of input/output channels for selecting one of the plurality of input/output channels for the transfer of each individual word of data according to a predetermined priority;

d. address generating means operably connected to said plurality of storage means and to at least one of said control means for generating addresses both for the selected input/output channel and for the processor to be used for the transfer of each individual word of data;

e. means for initiating the transfer of one word of data directly between the processor and the selected input/output channel, said means being operably coupled to receive signals from the processor and the selected input/output channel which indicate readiness to transfer one word of data;

f. detecting means operably coupled to said plurality of storage means for detecting the completion of the transfer of a block of data between the processor and the associated input/output channel.

g. a plurality of counter means, each associated with one of the plurality of input/output channels, for counting the number of words in the block of data for the associated input/output channel that have been transferred; and h. adder means coupled to said first registers, said second reigsters and each of said plurality of counter means for adding the beginning address of the input/output channel to the number of words that have been transferred to obtain the address in the selected input/output channel to be used for the transfer of the current word of data, and for adding the beginning address in the processor to the number of words that have been transferred to obtain the address in the processor to be used for the transfer of the current word of data.

2. An input/output controller as claimed in claim 1 wherein said detecting means comprises:

comparison means coupled to said third registers and to said plurality of counter means for comparing the number of words in the block of data to be transferred with the number of words that have been transferred thereby to detect the completion of the transfer of the block of data.

3. An input/output controller as claimed in claim 2 wherein said detecting means further comprises:

signal means coupled to said comparison means for sending a signal to the processor when the completion of the transfer of the block of data is detected.

4. An input/output controller as claimed in claim 1 wherein said first control means comprises:

a. first means operably controlled from the processor for initiating data transfer;

b. second means coupled to said detecting means and to the processor for terminating data transfer in response to signals from said detecting means or from the processor; and c. third means operably controlled from the processor for repetitively transferring a block of data.

5. In a digital system, an input/output controller for controlling the real time transfer of individual words of blocks of data between a processor and a plurality of input/output channels, each of said input/output channels including at least one peripheral device selectively connected to said processor by said input/output controller, each block of data being associated with an individual input/output channel, said input/output controller comprising:

a. a plurality of first storage means in said controller, each associated with one of the plurality of input/output channels, each of said plurality of first storage means holding the beginning input/output channel address for the transfer of the block of data;

b. a plurality of second storage means in said controller, each associated with one of the plurality of input/output channels, each of said plurality of second storage means holding the beginning processor address for the transfer of the associated block of data;

c. a plurality of third storage means in said controller, each associated with one of the plurality of input/output channels, each of said plurality of third storage means holding the number of words in the associated block of data to be transferred;

d. a plurality of counter means, each associated with one of the plurality of input/output channels, for counting the number of words in the associated block of data that have been transferred;

e. a plurality of first control means, each associated with one of the plurality of input/output channels, each of said plurality of first control means being operative to control when data is to be transferred between the processor and the associated input/output channel, each of said plurality of first control means being operably controlled from the processor;

f. second control means operably connected to said plurality of first control means and to the plurality of input/output channels for selecting one of the plurality of input/output channels for the transfer of one word of data according to a predetermined priority;

g. address generating adder means having a first mode wherein it is operably connected to said plurality of second storage means and to said plurality of counter means and is responsive to said first control means for adding the beginning processor address to the number of words that have been transferred to the selected input/output channel to get the processor address to be used for the transfer of a current word of data; and said adder means having a second mode wherein it is operably connected to said plurality of first storage means and to said plurality of counter means and is responsive to said second control means for adding the beginning address of the selected input/output channel to the number of words that have been transferred to the selected input/output channel to get the address in the selected input/output channel to be used for the transfer of a current word of data;

h. means for initiating the transfer of one word of data directly between the processor and the selected input/output channel, said means being operably coupled to receive signals from the processor and the selected input/output channel which indicate readiness to transfer one word of data; and i. detecting means operably connected to said plurality of third storage means and to said plurality of counter means for comparing the number of words in the block of data for the selected input/output channel with the number of words that have been transferred for the selected input/output channel and thereby detecting the completion of the transfer of the block of data.

* * * * *